(12) United States Patent
Carter

(10) Patent No.: US 9,675,047 B2
(45) Date of Patent: Jun. 13, 2017

(54) PORTABLE PET DRYING AND WASHING APPARATUS

(71) Applicant: Ronald A. Carter, Palmdale, CA (US)

(72) Inventor: Ronald A. Carter, Palmdale, CA (US)

( * ) Notice: Subject to any disclaimer, the term of this patent is extended or adjusted under 35 U.S.C. 154(b) by 345 days.

(21) Appl. No.: 14/311,153

(22) Filed: Jun. 20, 2014

(65) Prior Publication Data

US 2015/0366163 A1    Dec. 24, 2015

Related U.S. Application Data

(60) Provisional application No. 61/836,329, filed on Jun. 18, 2013.

(51) Int. Cl.
*A01K 15/00*    (2006.01)
*A01K 29/00*    (2006.01)
*A01K 13/00*    (2006.01)

(52) U.S. Cl.
CPC .................. *A01K 13/001* (2013.01)

(58) Field of Classification Search
USPC ........ 119/672–678, 304–306, 315–317, 606, 119/600, 602, 668, 671, 651, 650, 700, 119/703; D30/158, 108
See application file for complete search history.

(56) References Cited

U.S. PATENT DOCUMENTS

| | | | |
|---|---|---|---|
| 3,108,568 A | 10/1963 | Whitney et al. | |
| 3,175,534 A | 3/1965 | Pollard | |
| 3,286,370 A * | 11/1966 | Hope | G03D 15/027 219/400 |
| 3,596,636 A | 8/1971 | Stobaugh | |
| 3,884,191 A * | 5/1975 | Stout | A01K 13/001 119/671 |
| 3,962,993 A | 6/1976 | Dattilo | |
| 3,985,102 A | 10/1976 | Yonezawa | |
| 4,057,032 A * | 11/1977 | Dimitriadis | A61D 11/00 119/671 |
| RE30,266 E | 5/1980 | Greene et al. | |
| 4,314,410 A | 2/1982 | Nichols | |
| 4,505,229 A * | 3/1985 | Altissimo | A01K 13/001 119/668 |

(Continued)

FOREIGN PATENT DOCUMENTS

| | | |
|---|---|---|
| EP | 0144499 A2 | 6/1985 |
| EP | 1652425 A1 | 5/2006 |

*Primary Examiner* — Andrea Valenti
(74) *Attorney, Agent, or Firm* — Patent Analysis Reseach Tech. Systems LLC; George L. Walton

(57) ABSTRACT

The present invention discloses a pet or animal drying and washing apparatus a two part housing structure with a slidable and removable inner housing shell with guides and an outer housing shell with recesses on their respective side walls so that they can be easily connected together as a single unit and form a heating flow passage there between. The outer shell having inner and outer walls conforming to a contour shape and having support and air channel blocks on a bottom floor to support an inner shell housing having a plurality of slotted vents disposed on side walls and back walls and between bottom floors of the inner and outer shell housings. A blower and heating unit is disposed within a back wall cavity of the outer shell housing and closed by a thermostatic control device to direct heated air in the heating flow passage.

20 Claims, 5 Drawing Sheets

(56) References Cited

U.S. PATENT DOCUMENTS

| | | | |
|---|---|---|---|
| 4,559,903 A | 12/1985 | Bloom et al. | |
| 4,718,375 A | 1/1988 | Krieger | |
| 4,930,453 A * | 6/1990 | Laliberte | A01K 13/001 |
| | | | 119/671 |
| 4,947,799 A | 8/1990 | Parker | |
| 5,283,962 A | 2/1994 | Humann | |
| 6,058,886 A | 5/2000 | Haines | |
| 6,425,347 B1 | 7/2002 | Bogner et al. | |
| 6,560,779 B1 | 5/2003 | Savage et al. | |
| 6,826,850 B2 | 12/2004 | Jewell | |
| D603,109 S * | 10/2009 | Kim | D30/158 |
| D612,999 S * | 3/2010 | Migita | D30/108 |
| 8,061,304 B1 * | 11/2011 | Ramsay | A01K 13/001 |
| | | | 119/671 |
| D653,818 S | 2/2012 | Schetlin et al. | |
| 8,371,246 B1 | 2/2013 | Streng | |
| 2003/0196608 A1 * | 10/2003 | Lee | A01K 13/001 |
| | | | 119/651 |
| 2009/0173286 A1 | 7/2009 | Schetlin et al. | |
| 2011/0017147 A1 * | 1/2011 | Petruzzi | A01K 13/001 |
| | | | 119/604 |
| 2011/0061602 A1 * | 3/2011 | Moharram | A01K 13/001 |
| | | | 119/651 |
| 2011/0126775 A1 | 6/2011 | Seltzer et al. | |
| 2015/0075439 A1 * | 3/2015 | Sogou | A01K 1/0107 |
| | | | 119/166 |

\* cited by examiner

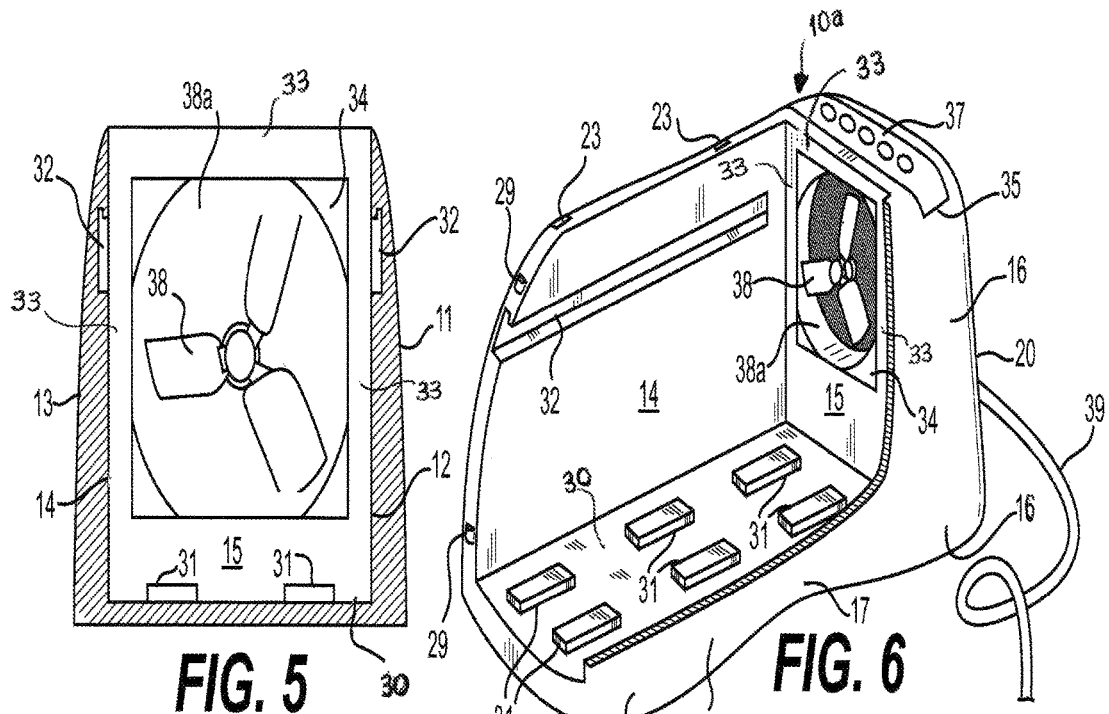
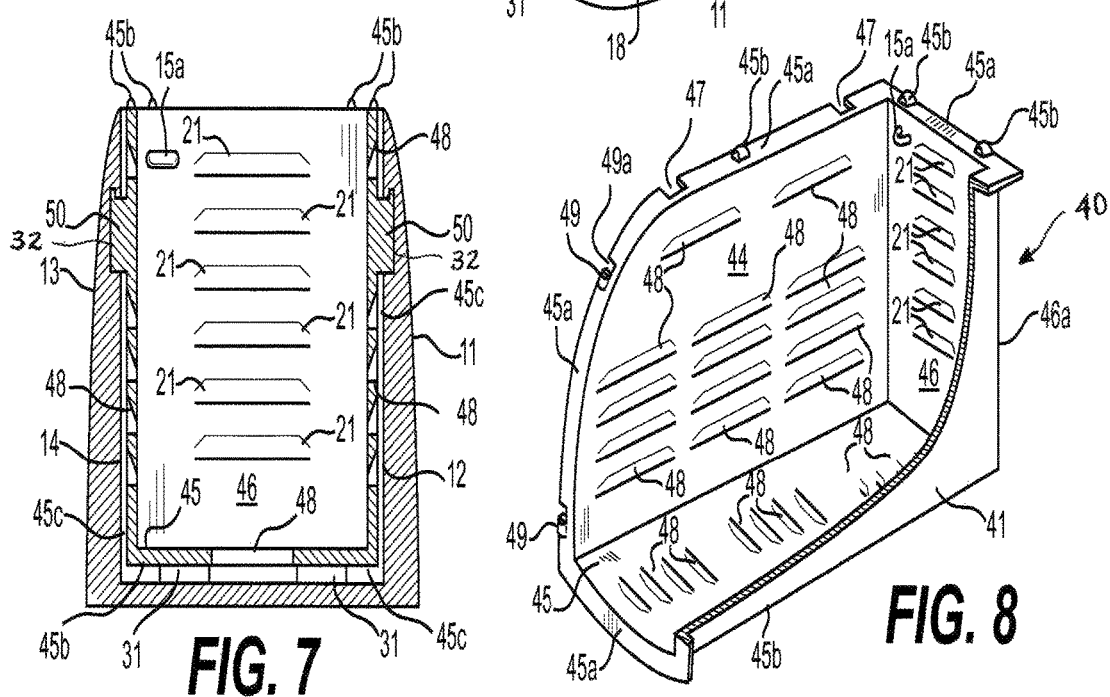

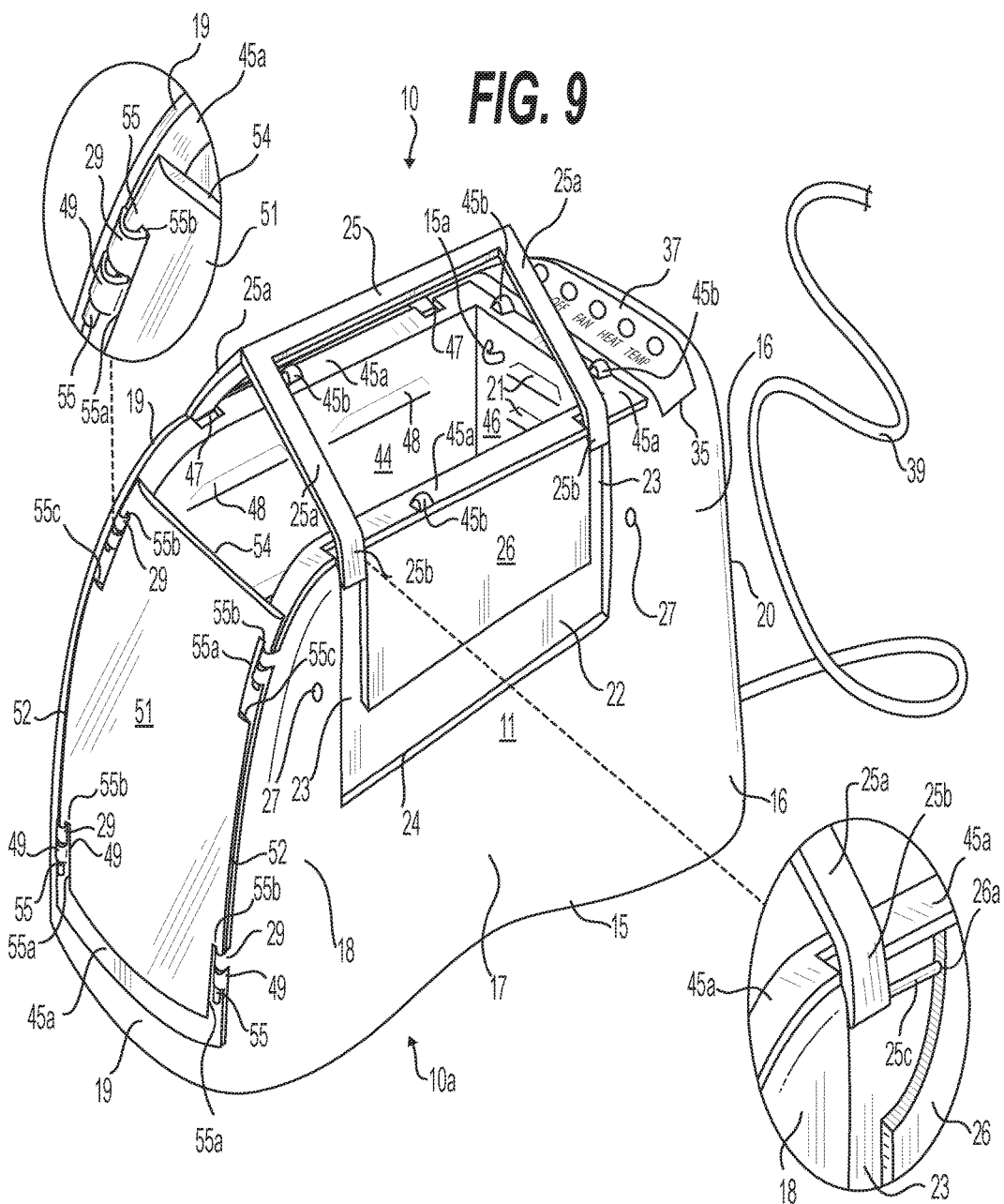

PORTABLE PET DRYING AND WASHING APPARATUS

CROSS REFERENCE TO RELATED APPLICATION(S)

This instant application claims priority to U.S. Provisional Patent Application, Ser. No. 61/836,329, filed on Jun. 18, 2013.

BACKGROUND OF THE INVENTION

1. Field of the Invention

The present invention relates to a unique pet drying and washing apparatus having outer and inner housing shells for receiving variable and controllable forced drying heat for thoroughly drying the fur coat of the pet or animal. The inner housing shell can be easily removed from the outer housing shell and utilized for washing, shampooing and rinsing pets or animals.

2. Description of the Related Art

At the present time, there are many different types of drying apparatuses utilized for pets or animals after they have gone through a wash, shampoo and rinse cycle. Note that these drying apparatuses are utilized by many pet owners, veterinarians, pet or animal groomers and other pet or animal professionals.

It is well known that the current drying apparatuses for the drying of pets or animals, primarily dogs' undercoat is not quickly and thoroughly dried after going through the aforementioned wash, shampoo and rinse cycle, which can subject the pet or animal to possible illness. Also, the current drying apparatuses fail to distribute the forced heat efficiently proportional and controllable so that the pets or animals do not experience heat discomfort to their bodies.

Also, the current pet or animal drying apparatuses fail to teach a removable inner shell housing that can be easily and quickly removed from the outer shell housing for washing, shampooing and rinsing a pet or animal therein without being labor intensive due to many housing components and screws. For the most part, a majority of the current and prior The prior art patents disclose pet or animal drying apparatuses with separate blower unit compartments with a blower unit disposed therein, a removable inner housing shell and doors for retaining pets or animals within the pet or animal drying apparatuses Note that the pet or animal drying apparatuses, which take on many different designs and structures are disclosed and described in U.S. Pat. Nos. 3,175,534 3,962,993, 3,985,102, 4,314,410, 4,559,903, 5,283,962, 6,058,886, 6,425, 947, 6,826,850, U.S. Publication No. 2009/0173286, EP 0144499 and EP 1652425 to name just a few of interest. However, they do not singly or in any combination teach the claimed invention.

SUMMARY OF THE INVENTION

The present invention discloses a pet or animal drying and washing apparatus a two part housing structure with a slidable and removable inner housing shell that can be utilized for washing, shampooing and rinsing a pet or animal.

A further aspect of an embodiment of the present invention provides an outer housing shell having a contour shape with a pair of high opposite ends joined by a lower or valley area, which resembles a wave configuration. The outer housing shell includes a pair of outer and inner side walls, an interior or inner back wall, an exterior or outer back wall, a bottom floor and a front face having an arcuate or curved like shape defining an interior open space or compartment for receiving the inner housing shell. This outer housing shell front face includes a continuous peripheral edge face that borders the pair of outer and inner side walls extending from the bottom floor up along the arcuate or curved like front face to the back wall that is integrally connected to the pair of outer and inner side walls The arcuate or curved like front peripheral edge face includes a pair of spaced apart upstanding door retaining members disposed thereon for receiving retaining pin members of a door member.

The interior back wall having a cut-out section that is wider than a fan opening that receives a fan device of a blower and heating unit.

The pair of interior or inner side walls includes a stepped longitudinal or elongated channel extending from the arcuate or curved like front face between the pair of spaced apart upstanding door retaining members to the back wall but spaced from the cut-out section and adjacent the top of the interior or inner side walls.

Further, the bottom floor of the outer housing shell includes a plurality of spaced apart raised support members for supporting the inner housing shell and providing heated air flow channels.

An aspect of an embodiment of the present invention further provides the aforementioned outer housing shell with a rear blower and heater compartment disposed between the back wall cut-out section and the exterior back wall for housing a blower and heating unit and a thermostat control device inserted in a top opening of the compartment for closing and sealing the blower and heater compartment. The exterior back wall includes an opening that receives an electrical adapter plug that connects directly to the blower and heating unit, while at the same time sealing the adapter plug opening. Also, the exterior back wall includes a plurality of slotted intake air vent openings to the blower and heating unit.

A further aspect of an embodiment of the present invention provides a U-shaped recessed pocket member in each of the outer side walls of the outer housing shell with a center solid member for receiving a pair of handle members therein. The pair of handle members having a pair of sliding leg portions joined together at one end by a gripping hand portion and the lower ends of the leg portions having a bent section. The bent sections of each of the pair of handle members are joined together by a bar-like member. A small gap is formed between a back wall of a center solid member and an outer wall within the recessed pocket member on each side of the outer housing shell with a recessed cavity formed along a back surface of the back wall for receiving each of the bar-like members.

When the pair of handle members are retracted upward along each of the recessed pocket members, the bar-like members are moved along each of the small gap within of each of the recessed pocket members, this movement causes the bent portions of the handle members to be moved into aligned slots in outer peripheral surfaces of the inner and outer housing shells, which enable the pair of handle members to pivot toward each other when the bar-like members are received within each of the recessed cavities. This enables a user to easily grasp the pair of handle members and carry the instant pet and or animal drying apparatus.

When the handle members are moved downward to a non-use position, the bent portions are pivoted out of each of the aligned slots, then each of the bar-like members are moved out of each of the recessed cavities and move within each of the recessed pocket members until a bottom portion of each of the handle grasping portions abut and rest on a ledge portion below each of the center solid members until a user wants to move or carry the instant pet and or animal drying apparatus.

A further aspect of an embodiment of the present invention provides a pair of screw retaining openings on opposite sides of the aforementioned pair of U-shaped recessed pocket members that receives a screw retaining member or a screw or a pin and ball retaining device.

A further aspect of an embodiment of the present invention provides an inner housing shell that is removably inserted into the outer housing shell. The inner housing shell includes a pair of outer and inner side walls, an interior or inner back wall, an exterior or outer back wall, a bottom floor and a front peripheral edge lip having an arcuate or curved like shape defining an interior open space or compartment for holding a pet or animal therein. The front peripheral edge lip of the inner housing shell defines a continuous peripheral extending lip edge that borders the pair of outer and inner side walls extending from the bottom floor up along the arcuate or curved like front peripheral edge lip to the interior or inner and exterior or outer back walls that are integrally connected to the pair of outer and inner side walls.

The arcuate or curved like front peripheral edge lip includes a pair of spaced apart upstanding door retaining members for aligning with the spaced apart upstanding door retaining members of the outer housing shell for receiving retaining pin members of a door member there through.

The interior and exterior back walls having a plurality of slotted vent openings that are spaced from the aforementioned cut-out section fan opening that receives the fan device of the blower and heating unit for receiving heated air flow there through and into the inner housing shell open compartment.

The pair of exterior or outer side walls of the inner housing shell includes a stepped longitudinal or elongated guide member extending from the arcuate or curved like front peripheral edge lip between a pair of spaced apart upstanding door retaining members disposed thereon and to the interior or inner back wall of the inner housing shell but spaced from the cut-out section for the blower and heating unit of the outer housing shell and adjacent the top of the interior side walls to be slidably received within each of the stepped longitudinal or elongated channel member of the outer housing shell to allow the inner housing shell to be fully inserted into the outer housing shell. The stepped longitudinal or elongated guide members having a thickness so that when they slide along the stepped longitudinal or elongated channel members, they form an air flow cavity between the inner side walls of the outer housing shell and the outer side walls of the inner housing shell. Note that this air flow cavity conforms to a contour shape of the outer and inner walls of the outer housing shell. This allows for an even and constant distribution of the heated air flow.

In addition, the heated air flow gap is sealed by the continuous peripheral edge lip of the inner housing shell. This continuous peripheral edge lip will cover and engage the entire continuous peripheral edge face of the outer housing shell from the bottom floor up along and over the arcuate or curved like front face to the interior or inner and exterior or outer back walls with the cut-out section for the blower and heating unit of the outer housing shell that is integrally connected to the pair of outer and inner side walls of the outer housing shell. The continuous peripheral edge lip will fit flush with the bottom floor of the outer housing shell. Also, this continuous peripheral edge lip and the stepped longitudinal or elongated guide members combine to define and maintain the heated air flow gap constant.

Further, the bottom floor of the inner housing shell rests on the aforementioned plurality of raised and spaced support members of the outer housing shell and defining a heated air flow gap between the bottom floor of the inner housing shell and the bottom floor of the outer housing shell. The inner housing shell includes a plurality of spaced apart slotted vent members in the side walls and the bottom floor for receiving a constant heated air flow into the interior open compartment of the inner housing shell from the constant heated air gaps and through the raised and spaced support members that provide heated air flow channels.

A further aspect of an embodiment of the present invention provides a plurality of spaced apart handle support slots in a top portion of the continuous peripheral edge lip that receives the aforementioned bent handle sections therein when the pair of handles are retracted and pivoted so that a user can easily grasp them to carry or move the instant pet or animal drying and washing apparatus from location to location. The continuous peripheral edge lip includes a plurality of spaced apart upstanding cover retaining members positioned on a back portion thereof and along a side portion above the side walls that is spaced from the arcuate or curved like portion of the continuous peripheral edge lip defining an access opening to gain access to the pet or animal or to allow the pet or animal to see the owner, groomer or other pet professionals. Also, it serves to keep the pet or animal inside the instant pet drying and washing apparatus.

A further aspect of an embodiment of the present invention provides a retaining hole near each end of the stepped longitudinal guide members that align with the pair of screw retaining openings on opposite sides of the aforementioned pair of U-shaped recessed pocket members for receiving the screw retaining member or a screw or a pin and ball retaining device to maintain the inner and outer housing shells together as a single unit.

Another aspect of an embodiment of the present invention provides a separate door member and cover secured to the continuous peripheral edge lip of the inner housing shell to close a majority of the interior compartment of the inner housing shell with an access opening being formed between the door member and cover to accommodate the pet or animal.

An additional aspect of an embodiment of the present invention provides a hook member secured at a location along the inner or interior back wall of the inner housing shell for attaching a pet or animal leash thereto for securing the pet within the instant pet drying and washing apparatus.

Another aspect of an embodiment of the present invention provides the utilization of the inner housing shell as a washing tub for pets or animals, preferably when a pet owner, groomer and other pet or animal attendants want to wash, shampoo and rinse pets or animals outside. Optionally, a tub liner can be inserted into the inner housing shell with the door member attached so that a pet or animal can be washed, shampooed and rinsed inside or outside, while at the same time reducing messy conditions.

Additional aspects, objectives, features and advantages of the present invention will become better understood with regard to the following description and the appended claims of the preferred embodiments with reference to the accompanying drawings.

BRIEF DESCRIPTION OF THE DRAWINGS

The present invention may be better understood, along with its numerous objects, features, and advantages made apparent to those skilled in the art by referencing the accompanying drawings.

FIG. 5 illustrates a front view of the outer housing shell showing the blower and heating unit and raised bottom floor supports and air channels of the portable pet drying and washing apparatus according to the present invention.

FIG. 6 illustrates an isometric side cut-out sectional view of the outer housing showing an elongated or longitudinal guide channel on an interior side wall, a blower and heating unit in a back wall portion and raised bottom floor supports defining air flow channels of the portable pet drying and washing apparatus according to the present invention.

FIG. 7 illustrates a front view of the outer housing and inner housing shells connected as unit with a heated air flow gap formed there between with raised bottom floor supports defining air flow channels and elongated or longitudinal guide channels of the outer housing shell with elongated or longitudinal guide members of the inner housing shell being slidably received therein of the portable pet drying and washing apparatus according to the present invention.

FIG. 8 illustrates an isometric side cut-out sectional view of the inner housing shell with a plurality of slotted vents in the side walls, the back wall and a bottom floor of the portable pet drying and washing apparatus according to the present invention.

FIG. 9 illustrates a perspective view of the portable pet drying and washing apparatus with handle members pulled out to enable a user to easily carry the portable pet drying and washing apparatus according to the present invention.

DETAILED DESCRIPTION

Figure 1:
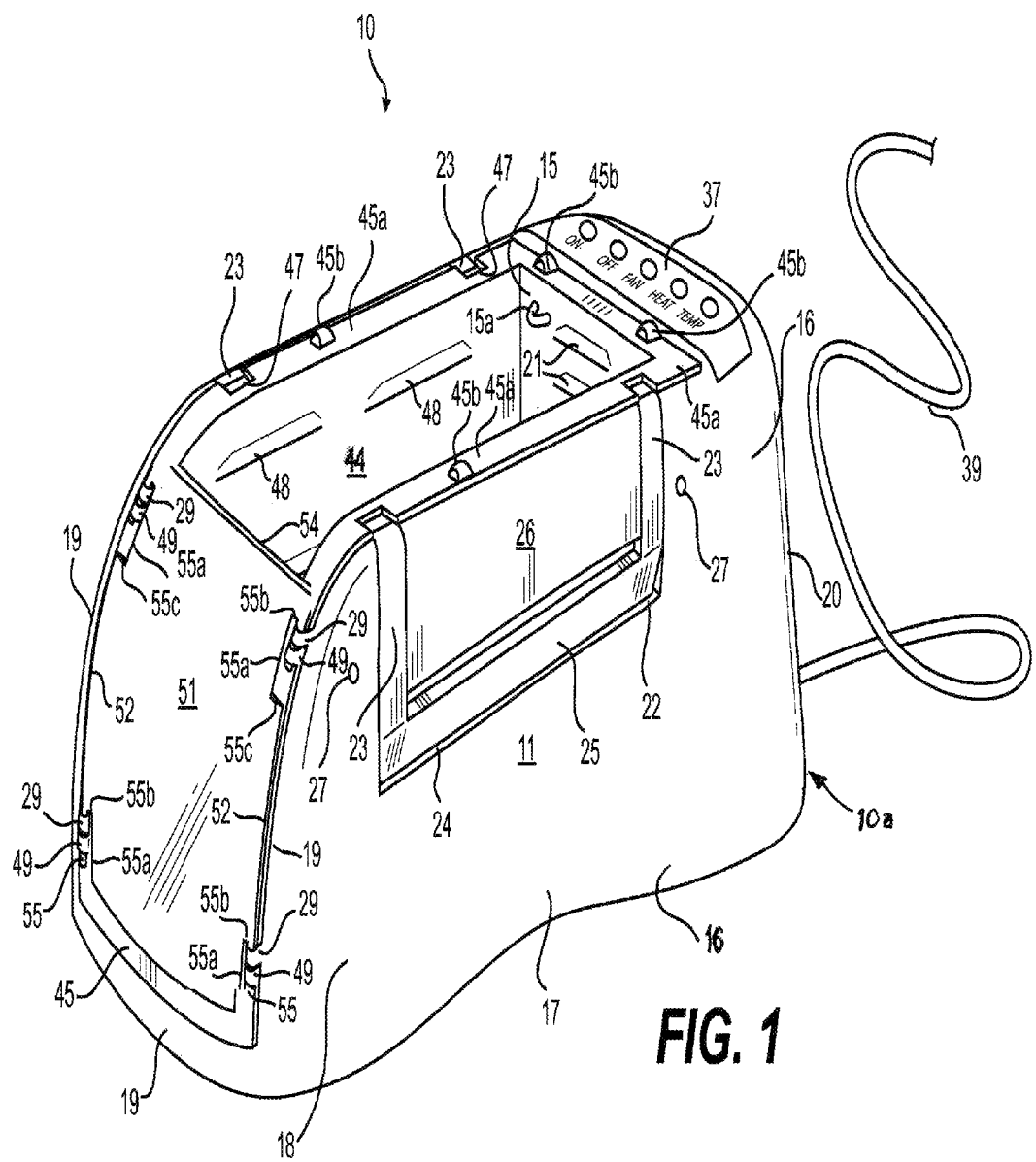
FIG. 1 illustrates a perspective view of the portable pet drying and washing apparatus according to the present invention.

FIG. 1 is a perspective view of the unique portable pet drying and washing apparatus 10. The portable pet drying and washing apparatus 10 shows inner housing shell 40 inserted in an outer housing shell 10a, which will be explained later in greater details as shown in the exploded view of FIG. 4. As shown in FIG. 1, the outer housing shell 10a includes outer side walls 11, 13 that has a contour shape that defines a wave like configuration with rear outward raised ends 16 and upper and lower front outward raised ends 18 connected there between by an intermediate arcuate or dished-like section 17 on both sides of the outer housing shell 10a. The importance of this configuration will be discussed later.

Figure 2:
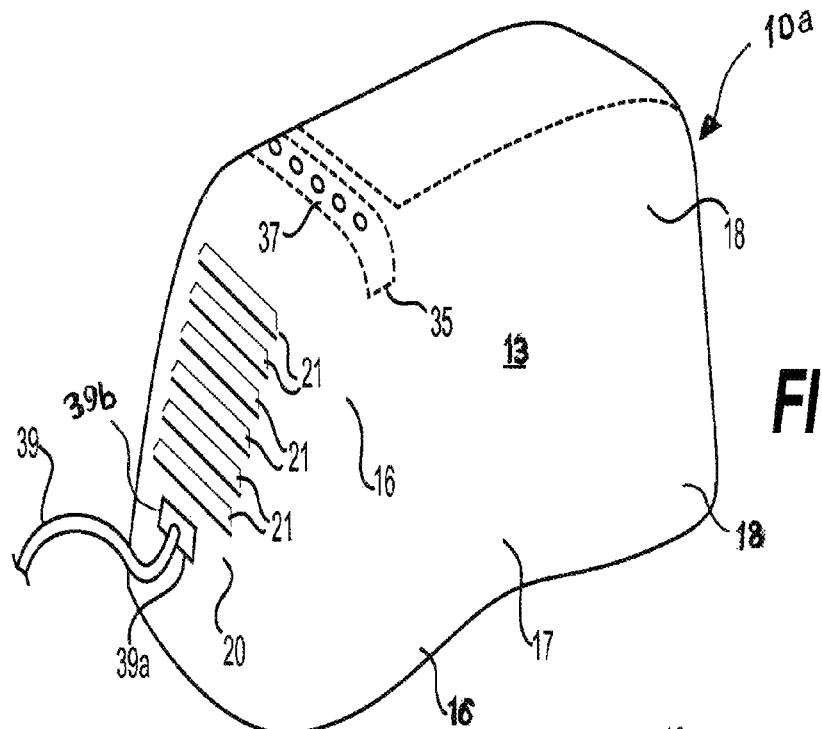
FIG. 2 illustrates a side isometric view of the portable pet drying and washing apparatus according to the present invention.

FIG. 2 is an isometric side view that shows the contour shape defined by the outer side wall 13 of the outer housing shell 10a, the rear upper and lower outward raised ends 16 and the upper and lower outward raised front ends 18, which is connected by the intermediate arcuate or dished-like intermediate section 17 and an outer back wall section 20. The outer back wall section 20 includes a plurality of slotted vent passages 21 that are either molded or cut therein. Below the vents 21 is a for receiving an electrical adapter plug 39a therein to connect directly to the back of the blower and heating unit defined by elements 35-38 and 38a as shown in greater details in FIG. 4. The electrical adapter plug 39a is attached to one end of an electrical cord 39. Note that the electrical adapter plug 39a seals the cut or molded slot 39b.

Figure 3:
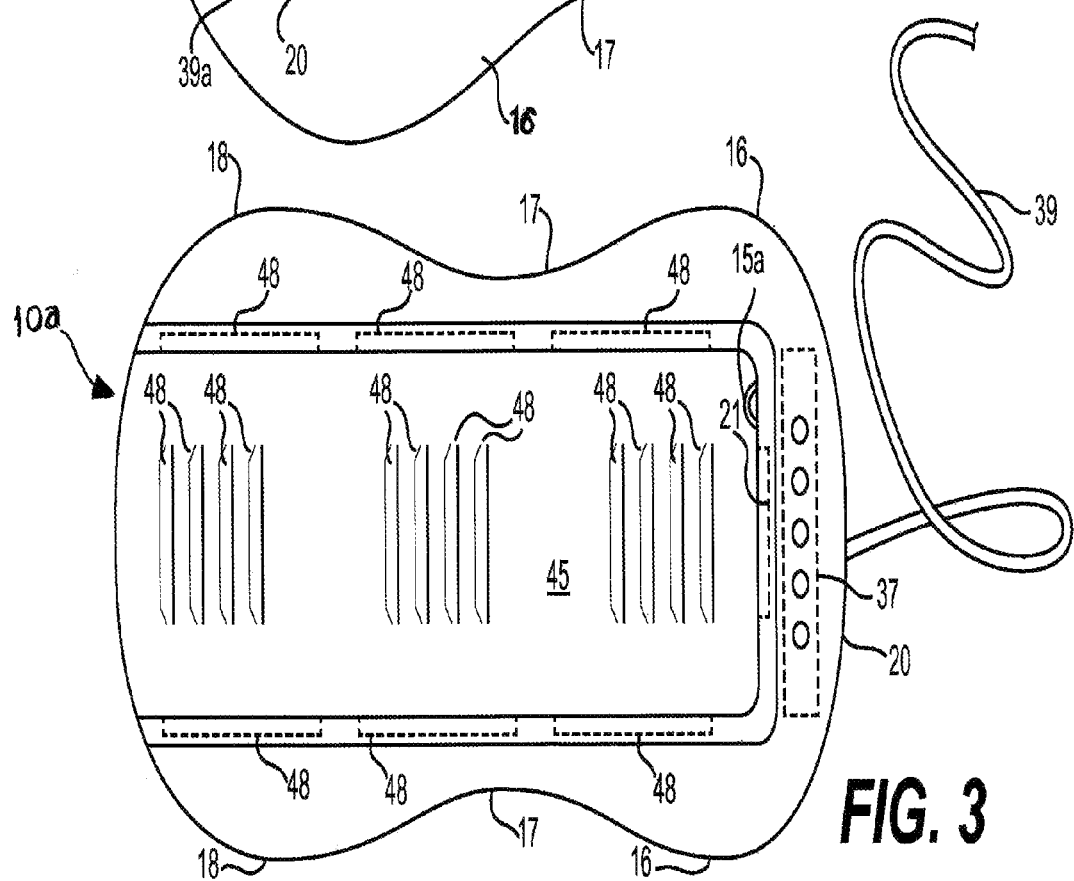
FIG. 3 illustrates top view of the portable pet drying and washing apparatus according to the present invention.

FIG. 3 is top view of the portable pet drying and washing apparatus 10 shows the contour shape defined by the outer side wall 12, the rear raised ends 16 and the raised front end 18, which are is connected by the lower valley intermediate section 17 and the back wall section 20. The top view of the inner housing shell 40 includes a plurality of cut or molded vent slots 48 in the outer side walls 41 and 43, outer side walls 42 and 44 and the bottom floor 45. A thermostatic control device 37 closes the blower and heating unit compartment 35 (see FIG. 4). Element 39 shows an electrical cord 39 that is connected to the blower and heating unit 35-38 and 38a as recited in FIG. 2 above.

Note that the contour and wavy configuration is defined by elements 16-18 shows a flow gap or space 45c that is wider at the rear upper and lower outward raised outer ends 16 and the front upper and lower outward raised outer ends 18 with a narrower or restricted section 17 disposed there between. As heated air from the blower and heating unit 35-38 and 38a flows from the wide rear upper and lower outward raised outer ends 16 to the narrower or restricted section 17 and then to the wide front upper and lower outward raised outer ends 18 stays constant throughout. When the heated air flows through the narrower or restricted section 17, the heated air flow velocity increases so that the heated air flow at the wide front upper and lower outward raised outer ends 18 is always constant.

Figure 4:
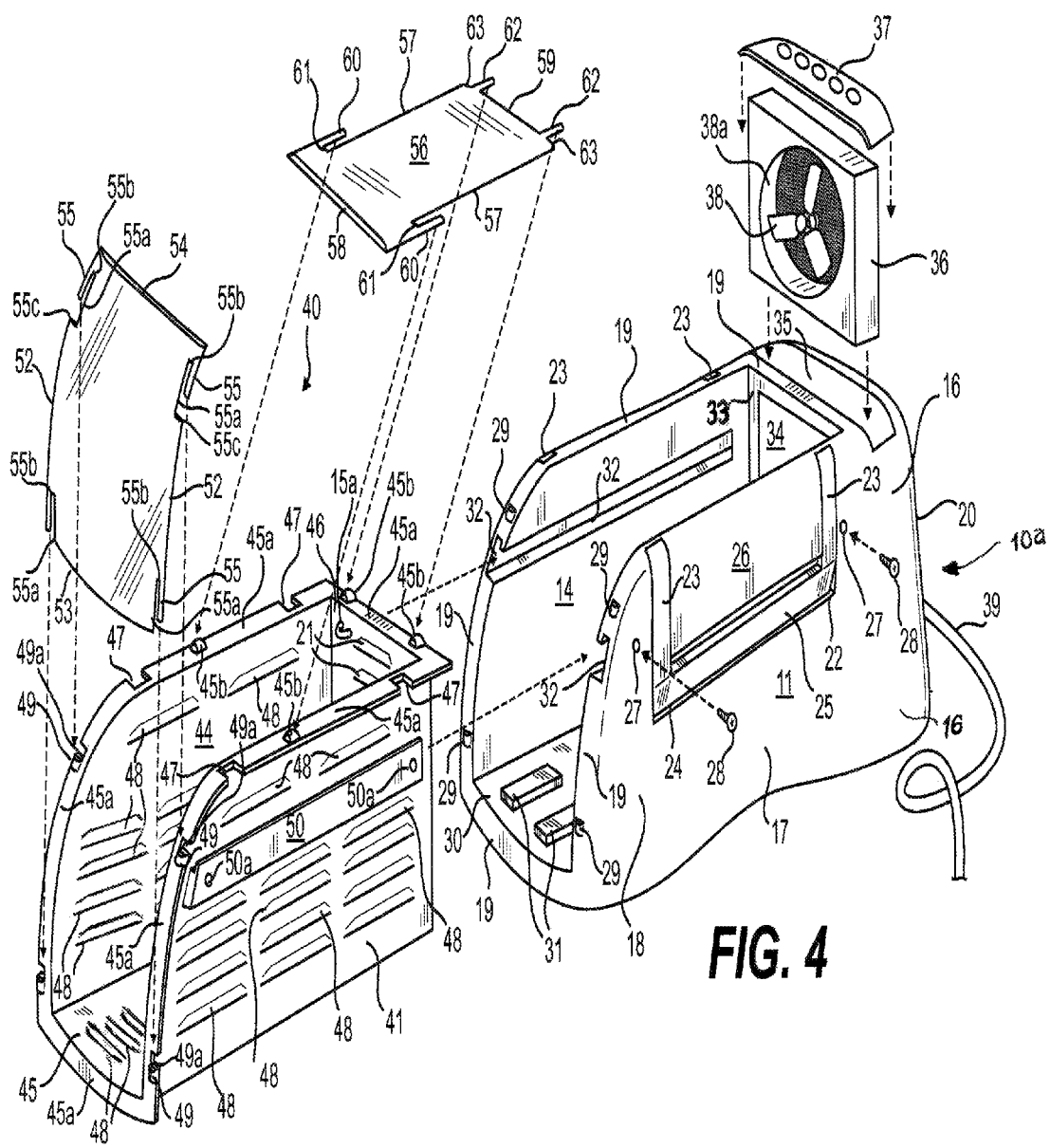
FIG. 4 illustrates a perspective exploded view of the portable pet drying and washing apparatus according to the present invention.

FIG. 4 is a perspective exploded side view of the inner housing shell 40, the outer housing shell 10a with a blower and heating assembly unit 35-38 and 38a, door member 51 and the cover 56. First, the outer housing shell 10a will be described in greater details to more clearly explain the claimed invention.

The outer housing shell 10a includes a pair of outer side walls 11, 13 and inner side walls 12, 14, an interior or inner back wall 15, an exterior or outer back wall 20, a bottom floor 30 and a front peripheral edge face 19 having an arcuate or curved like shape defining an interior open space or compartment for receiving the inner housing shell 40. Also, the front peripheral edge face 19 that extends along and borders the pair of outer side walls 11, 13 and inner side walls 12, 14 from the bottom floor 30 up along the arcuate or curved like front peripheral edge face 19 to the interior or inner back wall 15 that is integrally connected to the pair of outer side walls 11, 13 and inner side walls 12, 14 as a continuous peripheral edge face 19.

Note that the continuous peripheral edge face 19 includes a pair of spaced apart upstanding door retaining members 29 for receiving retaining pin members 55 of a door member 51 that closes a front portion of the inner housing shell 40 and its interior compartment that a pet or animal is placed in.

The interior back wall 15 having a cut-out section 34 that is wider than a fan opening 38a that receives a fan device 38 of a blower and heating unit 35-38 and 38a. Note that the back wall 15 has thinner sections along the sides and the top defined by element 33. This thinner section provides clearance for fan device 38 and enough wall section to maintain the blower and heating unit 35-38 and 38a within the blower and heating unit cavity 35.

The blower and heating unit cavity 35 is closed and sealed by a thermostatic control device 37. This thermostatic control device 37 preferably has a snap-fit arrangement for easy removal of the blower and heating unit 35-38 and 38a from blower and heating unit cavity 35. Note that other types of mechanical securing means could be used to secure the thermostatic control device over the blower and heating unit cavity 35, such as screws and pins, if desired. The snap-fit arrangement is preferred because it saves on labor time and money when the blower and heating unit 35-38 and 38a has to be serviced.

The pair of interior or inner side walls 12, 14 includes a stepped longitudinal channel 32 extending from the arcuate or curved like front peripheral edge face 19 between the pair of spaced apart upstanding door retaining members 29 to the interior back wall 15 but spaced from the cut-out section 34 and adjacent the top of the interior or inner side walls 12, 14. This allows heated air to flow evenly through the flow gap 45c between the inner housing shell 40 outer side walls 41, 43 and the outer housing shell 10a interior side walls 12, 14 as a function of the contour and wavy shape of the outer side walls 11, 13 and the inner side walls 12, 14 of the outer housing shell 10a as described above.

Further, the bottom floor 30 of the outer housing shell 10a includes a plurality of spaced apart raised support members 31 for supporting the inner housing shell 40 and providing heated air flow channels there between.

The aforementioned rear blower and heater cavity or compartment 35 is disposed between the back wall cut-out section 34 of back wall 15 and the exterior back wall 20. The exterior back wall 20 includes an opening that receives an electrical adapter plug 39a (FIG. 2) that connects directly to the blower and heating unit 35-38 and 38a, while at the same time sealing the adapter plug opening 39b. Also, the exterior back wall 20 includes a plurality of slotted intake air vent openings 21 that provides outside air directly to the blower and heating unit 35-38 and 38a.

Please note that the heating element is not shown, but it is one that is well known in the art or industry. The heating element is variably controlled by the thermostatic control device 37 by variables selected and not limited to the group consisting of temperature, time duration, speed, etc.

Also, the fan 38 may be of any well known type that is controlled and activated by pressing the fan control means button and/or the on/off buttons shown on the thermostatic control device 37. The power cord 39 cord and the power plug adapter provides AC power to the blower and heating unit 35-38 and 38a. Furthermore, the blower and heating unit 35-38 and 38a selected will be one that runs very quietly and is energy efficient. In selecting one that runs very quietly will help to make sure that the sound and any noise from the blower and heating unit 35-38 and 38a will not affect or scare the pet or animal that is enclosed in the pet drying and washing apparatus 10.

FIG. 4 provides a U-shaped recessed pocket member 22 in each of the outer side walls 11, 13 of the outer housing shell 10a with a center solid member 26 for receiving a pair of handle members 25 therein. The pair of handle members 25 having a pair of sliding leg portions 25a joined together at one end by a gripping hand portion 25 and the lower ends of the leg portions 23 having a bent section 25b (FIG. 9). The bent sections 25b are joined together by a bar-like member 25c FIG. 9). A small gap is formed between the center solid member 26 and the U-shaped recessed member 22 in each of the pair of outer side walls 11, 13 of the outer housing shell 10a with a recessed cavity 26a formed along a back surface of the solid member 26 for receiving the bar-like member 25c As shown in FIG. 4, a pair of screw retaining openings 27 is disposed on opposite sides of the aforementioned pair of U-shaped recessed pocket members 22 that receives a screw retaining member, a screw or a pin and ball retaining device 28 that will extend through the pair of retaining holes 27 in the outer housing shell side walls 11, 13 into the stepped elongated slide channels 32. The elongated slide channels 32 are cut or molded in the interior or inner side walls 12, 14 of the outer housing shell 10a.

Further in FIG. 4, the inner shell 40 will now be discussed. The inner housing shell 40 is removably inserted into the outer housing shell 10a. The inner housing shell 40 includes a pair of outer side walls 41, 43 and a pair of inner side walls 42, 44, an interior back wall 46, an exterior back wall 46a, a bottom floor 45 and an outward extending peripheral front edge lip 45a having an arcuate or curved like shape defining an interior open space or compartment for holding a pet or animal therein.

The peripheral front edge lip 45a extends to and borders an upper end of the pair of outer side walls 11, 13 and inner side walls 12, 14 extending from the bottom floor 45 up along the arcuate or curved like front lip face 45a to an upper end of the back wall 46 that is integrally connected to the pair of outer side walls 41, 43 and the inner side walls 42, 44 defining a continuous peripheral front edge lop 45a. The arcuate or curved like peripheral front edge lip 45a includes a pair of spaced apart upstanding door retaining members 49 and retaining slots 49a for aligning with the spaced apart upstanding door retaining members 29 of the outer housing shell 10a for receiving retaining pin members 55 of door member 51 there through to secure the door member 51 along the arcuate or curved like peripheral front edge lip 45a of the inner housing shell 40.

The interior or inner side walls 42, 44 and exterior or outer side walls 41, 43 includes a plurality of slotted vents 48 of the inner housing shell 40. The interior and exterior back walls 46, 46a, respectively, having a plurality of slotted vent openings 21 that are spaced from the aforementioned cut-out section 34 of interior back wall 15 of the outer housing shell 10a and the fan opening 38a that receives the fan device of the blower and heating unit 35-38 and 38a of the outer housing shell 10a for receiving heated air flow there through and into the inner housing shell 40 open compartment where the pet or animal is placed.

The pair of exterior or outer side walls 41, 43 includes a stepped longitudinal guide member 50 extending from the arcuate or curved like peripheral front edge face 45a between a pair of spaced apart upstanding door retaining members 49 and door retaining slots 49a to the interior back wall 46 but spaced from the cut-out section 34 of the interior back wall 15 of the outer housing shell 10a and adjacent the top of the exterior or interior side walls 41, 43 to be slidably received within the stepped longitudinal channel members 32 of the outer housing shell 10a to allow the inner housing shell 40 to be fully inserted into the outer housing shell 10a. The stepped longitudinal guide members 50 having a thickness such that when they are inserted along the stepped longitudinal channel members 32 defines an air flow cavity or gap 45c between the inner side walls 12, 14 of the outer housing shell 10a, and the outer side walls 41, 43 of the inner housing shell 40. In addition, this cavity or gap 45c conforms to the contour shape of the outer and inner side walls 11-14 of the outer housing shell 10a. This allows for an even and constant distribution of the heated air flow. In addition, the heated air flow gap 45c is sealed by the continuous peripheral edge lip 45a of the inner housing shell 40.

This continuous edge lip 45a will cover the entire continuous peripheral edge face 19 of the outer housing shell 10a from the bottom floor 30 up along and over the arcuate or curved like peripheral front edge face 19 to the back wall 15 with the cut-out section 34 that is integrally connected to the pair of outer and inner side walls 11-14. The bottom continuous peripheral edge lip 45a will fit flush with the bottom floor 30 of the outer housing shell 10a. Also, this continuous peripheral edge lip 45a and the stepped longitudinal guide member 50 combination define and maintain the heated air flow gap constant.

Further, the bottom floor 45 of the inner housing shell 40 rests on the aforementioned plurality of raised and spaced support members 31 of the outer housing shell 10a and defining a heated air flow gap 45c between the bottom floor 45 of the inner housing shell 40 and the bottom floor 30 of the outer housing shell 10a The inner housing shell 40 includes a plurality of spaced apart slotted vent members 48 in the side walls 41-44 and the bottom floor 45 for receiving a constant heated air flow into the interior open compartment of the inner housing shell 40 from the constant heated air gaps 45 and through the raised and spaced support members 31 defining heated air flow channels there between.

Also in FIG. 4, a plurality of spaced apart handle support slots 47 in a top portion of the continuous peripheral edge lip 45a that receives the aforementioned bent handle sections 26b (FIG. 9) therein when the pair of handles are retracted and pivoted so that a user can easily grasp them to carry or move the instant pet or animal drying and washing apparatus from location to location. The continuous peripheral edge lip 45a includes a plurality of spaced apart upstanding cover retaining members 45b positioned on a back portion thereof above the interior and exterior back walls 46, 46a, respectively, and along a side portion above the side walls 41-44 of the inner housing shell 40 and spaced from the arcuate or curved like portion of the front peripheral edge lip 45a to receive a cover 56 and defining an access opening there between to gain access to the pet or animal or to allow the pet or animal to see the owner, groomer or other pet professionals. Also, it serves to keep the pet or animal inside the instant pet drying and washing apparatus.

A retaining hole 50a near each end of the stepped longitudinal guide members 50 align with the pair the pair of screw retaining openings 27 on opposite sides of the aforementioned pair of U-shaped recessed pocket members 22 for receiving the screw retaining member, a pin and ball retaining device 28 to maintain the outer and inner housing shells 10a, 40 together as a single unit.

The door 51 includes retaining pin members 55 at the top and bottom of along the edges 52. Each of the top retaining pin members 55 having an inward longitudinal inner edge portion forming a slot 55a, a top closed end 55b and a bottom perpendicular extending ledge 55c that extends between the outer edge 52 and the inward longitudinal inner edge portion. The retaining pin members 55 extend downward and spaced from the bottom perpendicular extending ledge 55c. Each of the bottom retaining pin members 55 includes an inward longitudinal inner edge portion forming a slot 55a and a top closed end 55b. When the door is inserted the top pins extend through the door retaining members 29 of the outer shell 10a and the bottom retaining pin members 55 extend through the door retaining members 49 of the inner housing shell 40.

This allows the top end 55b to abut the door retaining member 29 when the retaining member 29 is fully inserted into the retaining slot 49a and the retaining members 29 and 49 being aligned and nested above one another. Such is achieved by the slot 55a and the inward edge thereof. Once this has happen, the ledge 55c will ride underneath the door retaining member 49 and be locked in. The bottom pin 55 is the same except it does not have the bottom ledge 55c that will ride underneath the door retaining member 49. There is no need for this feature on the bottom because element 29 is inserted and supported in slot 49a with pin 55 extending through aligned door retaining members 29 and 49 in a tight and retained position.

Further, the cover 56 is removably locked to the continuous peripheral edge lip 45a through cover retaining members 45b along the top of lip 45a above the interior and exterior side walls 41-44 of the inner housing shell 40 and along the top of the back side of the continuous edge lip 45a above the interior and exterior back walls 46, 46a of the inner housing shell 40. The cover 56 includes a pair of retaining pins 60 extending from the top 58 at an edge thereof, and a retaining pin 62 extending from bottom end 59 and inward of the outer edge 57 defining an outward extending ledge 63. The retaining pins 60 includes a slot formed between the retaining pins 60 and the inward edge 57 of the cover 56 with a closed top end 61. When the cover 56 is attached, the top retaining pins 60 are inserted through cover retaining members 45b along the top side of the continuous edge lip 45a with the defined slot and edge 57 riding along the inner surface of 45b and the closed end 61 abutting against the top of 45b with retaining pin 60 being fully inserted through cover retaining members 45b. As retaining pins 66 are inserted, the bottom retaining pins 62 are inserted through cover retaining members 45b along the top of the back side of the continuous peripheral edge lip 45a with outward extending ledge 63 abutting a portion of the top of cover retaining members 45b.

Note that the retaining pins 62 and 60 are tightly fitted within cover retaining members 45b, but yet easy to remove. Note that when the cover 56 and door 51 are inserted an access space is formed there between to gain access to the pet or animal or a large enough opening so that the pet or animal can interact with the owner, groomer or other professionals.

FIG. 5 is a front view of the portable pet drying and washing apparatus outer housing shell 10a. This view shows the outer housing shell and inner housing shell side walls 11-14, a lower bottom interior back wall portion 15, an inner floor 30 with raised and support members 31 that define heated air flow channels there between. Also, FIG. 5 shows a back wall 33 extending from a top end downward to the lower bottom interior back wall portion 15 with a cut-out section 34 disposed therein and being wide enough to uncover the blower fan 38 and the fan opening 38a. Also, the stepped elongated channels 32 are shown.

FIG. 6 illustrates an isometric side cut-out sectional view of the outer housing shell 10a showing an elongated guide channel 32 on the interior side wall 14, a blower and heating unit 35-37 and 38a, a lower bottom interior back wall 15 integral with a top end and downward extending side wall portions defining a back wall portion 33 with a cut-out section 34 disposed therein for receiving the blower and heating unit 35-37 and 38a. Also, raised bottom floor supports 31 define air channels disposed there between on a bottom floor 30 are shown.

FIG. 7 illustrates a front view of the outer housing shell 10a and the inner housing shell 40 connected together as a unit with a heated air flow gap 45c formed there between and between the raised bottom floor supports and defined air channels 31 and the bottom floor 45. Also, FIG. 7 shows the elongated sliding channels 32 of the outer housing shell 10a and the elongated sliding guide members 50 being slidably received therein. The back inner wall 46 is shown with a plurality of molded or cut-in vent slots 21. The inner and outer side walls 41-44 and the bottom floor 45 of the inner housing shell 40 are shown with a plurality of molded or cut-in vent slots 48. Also, the outer and inner side walls 11-14 of the outer housing shell 10*a* are shown.

FIG. 8 illustrates an isometric side cut-out sectional view of the inner housing shell 40 that shows a plurality of slotted vents 48 in the inner and outer side walls 41-44, the interior or inner back wall 46 having a plurality of vented slots 21 and the bottom floor 45 having a plurality of slotted vents 48. Also, the inner housing shell 40 shows the continuous peripheral edge lip 45*a* with the door retaining members 49 and slots 49*a* and the handle slots 47 for the handle bent portion 26*b*.

FIG. 9 will not be discussed in details, because it would be redundant to FIG. 4. However, the retraction of the handle members 25 will now be discussed. When the pair of handle members 25 are retracted upward along the recessed pocket member 22 and the bar-like member 25*c* is moved along a small gap behind the solid member 26 and into the recessed cavity 26*a* disposed on a back surface thereof. The bent portions 25*b* of the handle members 25 are moved into the aligned slots 23 and 47 in a top surface of the continuous outer peripheral edge face 19 of the inner housing shell 40 and the outer housing shell 10*a*. This enables the pair of handle members 25 to pivot to toward each other and allows a user to easily grasp the pair of handle members 25 and carry the instant pet drying and washing apparatus 10.

When the handle members 25 are moved downward to a non-use position, the bent portions 26*b* are pivoted out of the aligned slots 23 and 47, the bar-like member 25*c* is moved out of the recessed cavity 26*a* and slide along the handle leg recesses 23 until a bottom portion of the handle members 25 abuts and rest on a ledge portion 24 of the outer housing shell 10*a* below the center solid member 26 until a user want to move or carry the instant pet drying and washing apparatus 10.

Furthermore, the inner back wall 46 includes a hook-like member 15*a* disposed thereon for securing a pet's leash thereto, if the pet or animal need to be restrained. This hook-like member can be attached in many ways, such as being a molded member, a screw-like member or a welded member, if metals are used.

Note that the inner housing shell 40 can be used as a washing tub for pets or animals, preferably when a pet owner, groomer and other pet or animal professionals need to wash, shampoo and rinse pets or animals outside. Optionally, a tub liner (not shown) can be inserted into the inner housing shell 40 with the door 51 being attached via the door retaining members 49 so that a pet or animal can be washed, shampooed and rinsed inside or outside, while at the same time reducing messy conditions, if desired.

The entire portable pet drying and washing apparatus 10 including the door 51 and the cover 56 can be made preferably out of different types of rigid plastic materials. However other types of rigid materials, selected from and not limited to the group consisting of polymers, polyethylene, nylon, rubber, nylon, neoprene, Plexiglas, any suitable transparent material and any combination of the aforementioned materials can be used. Note that the above mentioned materials can be semi-rigid material, if desired. Also, the apparatus can be made out of stainless steel or other metals, if desired.

While the foregoing written description of the invention enables one of ordinary skill in the art to make and use what is considered presently to be the best mode thereof, those of ordinary skill will understand and appreciate the existence of variations, combinations, and equivalents of the specific embodiment, method, and examples herein. The invention should therefore not be limited by the above described embodiments, and examples, but by all embodiments and methods within the scope and spirit of the invention as claimed.

What is claimed is:

1. A portable pet drying and washing apparatus comprising:
    an outer housing shell having a front arcuate peripheral edge face, a pair of inner and outer side walls, an inner back wall, an outer back wall and a bottom floor;
    the outer housing shell front arcuate peripheral edge face is extended upward and straight across the top of the pair of inner and outer side walls, the inner back wall, the outer back wall and along the front of the bottom floor to form an outer shell housing continuous peripheral edge face;
    a blower and heating cavity is formed between the outer back wall and the inner back wall of the outer housing shell and the cavity being closed by a blower and heating control device;
    the outer housing shell having an elongated stepped recess along the pair of inner side walls;
    an inner housing shell having a front arcuate peripheral edge lip, a pair of inner and outer side walls, an inner back wall, an outer back wall, and a bottom floor;
    the front arcuate peripheral edge lip of the inner housing shell is extended upward and straight across the top of the inner and outer side walls, the inner and outer back walls and about the bottom floor to form an inner housing shell continuous edge lip that will overlap the continuous peripheral edge face of the outer housing shell and being in flush engagement therewith; and
    a pair of elongated stepped guide members disposed on and along the outer side walls of the inner housing shell that are slidably received within the elongated stepped recesses to lock the inner housing shell within the outer shell housing to form a single unit with an inner housing shell drying chamber.

2. The portable pet drying and washing apparatus according to claim 1, wherein the pair of elongated stepped recesses extend from the front arcuate peripheral edge face of the outer housing shell to a location near the inner back wall thereof but spaced there from, the pair of elongated stepped guide members having a front end positioned just inside the arcuate peripheral edge lip and extending along the side walls of the inner housing shell to a location near the outer back wall of the inner housing shell and spaced there from to define a heated air flow space between the inner back wall of the outer housing shell and the outer back wall of the inner housing shell.

3. The portable pet drying and washing apparatus according to claim 2, wherein the inner and outer side walls of the outer housing shell has a contour shape in the form of a wave-like configuration extending from the arcuate front peripheral edge face and the outer back wall of the outer housing shell, this contour shape has a pair of raised ends connected there between by a valley like section.

4. The portable pet drying and washing apparatus according to claim 3, wherein the elongated guide members extend outward a specified distance from the outer side walls of the inner housing shell so that the inner side walls of the outer housing shell is spaced there from to define a heated air space there between.

5. The portable pet drying and washing apparatus according to claim 4, wherein the bottom floor of the outer housing shell includes a plurality of raised and spaced apart support members disposed thereon.

6. The portable pet drying and washing apparatus according to claim 5, wherein the raised and spaced apart support members serves to elevate the bottom floor of the inner housing shell away from the bottom floor of the outer housing shell to create a heated air space there between and air flow channels formed between the spaced apart support members.

7. The portable pet drying and washing apparatus according to claim 6, wherein the heated air space formed between the bottom floors of the inner and outer housing shells, the heated air flow space formed between the outer side walls of the inner housing shell and the inner side walls of the outer housing shell, and the heated air flow space between the inner back wall of the outer housing shell and the outer back wall of the inner housing shell forming a continuous heated air flow passage that evenly distributes the heated air flow to achieve a more efficient and thorough drying over a shorter period of time.

8. The portable pet drying and washing apparatus according to claim 7, wherein the heated air flow strikes against an inward inner protruding portion defined by the contour shape of the inner and outer side walls of the outer housing shell that forces air more quickly and efficiently and into the inner drying chamber of the inner housing shell for drying a pet or animal.

9. The portable pet drying and washing apparatus according to claim 3, wherein the outer side walls of the outer housing shell includes a U-shaped handle cut-out with a solid member there between, the U-shaped cut-out has a ledge disposed below the solid member with the U-shaped cut-out being below the ledge, the solid member has a cavity disposed behind the solid member with a retaining recess and a pair of sliding handle leg portions that borders the solid member with a pivot handle recess at the top continuous peripheral edge face of the outer housing shell.

10. The portable pet drying and washing apparatus according to claim 9, wherein the U-shaped handle cut-out includes a handle member that is slidably received therein, the handle member has an inverted U-shape configuration relative to the U-shaped handle cut-out, the handle member has a longitudinal handle grasping portion and extending perpendicularly from each end is a pair of longitudinal extending legs with a bent portion at the very end, a retaining rod extends horizontally between the longitudinal extending legs and secured at the bent portions, in a non-use position, the handle grasping portion rests on the handle cut-out ledge and the remaining portion of the handle being stored within the handle cut-out below the handle ledge, when the handle is to be retracted from the non-use position, the user grasp the handle off the ledge and the pair of longitudinal extending legs will move along the sliding leg portions until the retaining rod is received within the retaining recess within the cavity disposed behind the solid member, once this happens, the bent portions can be pivoted inward into the pivot handle recess at the top continuous edge face of the outer housing shell and an aligned pivot cut-out recess in the continuous edge lip of the inner housing shell so that the pair of handle grasping portions come together to allow a user to easily carry the portable pet drying and washing apparatus and moved in a reverse manner back to the non-use position.

11. The portable pet drying and washing apparatus according to claim 10, wherein the outer housing shell has a pair of retaining holes extending through the outer and inner side walls of the outer housing shell disposed on opposite sides of the U-shaped handle cut-out to receive a pair of retaining members to lock the elongated stepped recess and the elongated stepped guide member in place against any movement and maintaining the inner and outer housing shells together as a unit, each end of the elongated stepped recess and the elongated stepped guide member includes a pair of holes that align with the pair of retaining holes in the outer and inner side walls of the outer housing shell to receive the pair of retaining members.

12. The portable pet drying and washing apparatus according to claim 1, wherein the inner back wall of the outer housing shell has a major cut-out portion disposed therein and being bordered by a remaining wall portion.

13. The portable pet drying and washing apparatus according to claim 12, wherein a blower and heating unit being disposed in the blower and heating cavity, the blower and heating unit has a fan member that is disposed in the major cut-out portion so that the air flow from the fan is never impeded, and the remaining portion of the blower and heating unit is held in place by the bordered remaining wall portion of the inner back wall of the outer housing shell and an interior wall of the outer back wall of the outer housing shell that defines the blower and heating cavity.

14. The portable pet drying and washing apparatus according to claim 13, wherein the blower and heating unit having a control device, the control device includes a thermostatic control member with activating control buttons thereon to control the control blower and heating unit relative to variables being selected from the group consisting of time duration, temperature, speed, fan operation and on/off operations.

15. The portable pet drying and washing apparatus according to claim 1, wherein the outer shell housing front arcuate continuous peripheral edge face having at least a pair of spaced apart raised door retaining members on both sides thereof, with an upper door retaining member placed above an entrance of the elongated stepped recess and a lower door retaining member being placed above and adjacent the bottom floor of the outer housing shell.

16. The portable pet drying and washing apparatus according to claim 15, wherein the portable pet drying and washing apparatus having an arcuate shaped door, the door includes a pair of sides, a top end and a bottom end, a pair of peripheral edge spaced apart locking pins located at the top and bottom ends, the top locking pins have inward slots formed in the door having a closed top end, a longitudinal edge and a ledge extending from the longitudinal edge to the sides of the door and the bottom locking pins have inward slots formed in the door having a closed top end and a longitudinal edge extending to the bottom of the door.

17. The portable pet drying and washing apparatus according to claim 16, wherein the inner shell housing continuous peripheral edge lip having at least a pair of spaced apart upper and lower raised door retaining members disposed on both sides along the continuous peripheral edge lip thereof, a cut-out slot is disposed above and contiguous to the at least a pair of spaced apart raised door retaining members disposed on both sides along the continuous peripheral edge lip, the continuous peripheral edge lip that extends above the side walls of the inner housing shell include at least a pair of cover retaining members disposed thereon but spaced from the upper door retaining members of the continuous peripheral edge lip, at least a pair of cover retaining members being spaced and placed on the continuous peripheral edge lip above the back walls of the inner housing shell and the upper door retaining member that is disposed above a front end of the elongated stepped guide member and a lower door retaining member being placed above and adjacent the bottom floor of the outer housing shell.

18. The portable pet drying and washing apparatus according to claim 17, wherein the arcuate shaped door is placed over the front arcuate continuous peripheral edge lip of the inner shell housing, which is placed over the front arcuate continuous peripheral edge face of the outer housing shell when the inner housing shell stepped elongated guide member is inserted along the stepped elongated recess of the outer housing shell so that the inner housing shell is inserted fully into the outer housing shell so that the upper and lower retaining door members of the outer housing shell are received into the cut-out slots in the front arcuate continuous edge lip of the inner shell housing and placing the upper and lower retaining door members in direct alignment with one another, this direct alignment will allow the upper and lower locking pins to be inserted through the upper and lower door retaining members of the outer and inner housing shells to tightly secure the door to the portable pet drying and washing apparatus, the longitudinal edge and the inward slots will move along the inner sides of the upper and lower door retaining members of the inner and outer housing shells so that the door will move down to a tight secure position or moved up out of the tight secure position easily without any interference.

19. The portable pet drying and washing apparatus according to claim 18, wherein the portable pet drying and washing apparatus further include a cover member, the cover member include a plurality of upper and lower securing pins, the plurality of upper securing pins having an inward longitudinal slot and inward edge, the plurality of lower cover securing pins having an inward shoulder flange, the cover securing pins are removably inserted in the at least a pair of off-set cover retaining members positioned above the side and back walls of the inner housing shell easily as a result of the inward longitudinal slot and inward edge and the inward shoulder flange as they slide relative to the off-set cover retaining members so that the cover is spaced from the top end of the arcuate door leaving an access opening there between to allow one to tend to the pet or animal while preventing the pet or animal from getting out.

20. The portable pet drying and washing apparatus according to claim 8, wherein the side walls, the back walls, and the bottom floor of the inner housing shell include a plurality of slotted vent openings disposed therein to allow the heated air flow passing through the continuous heated air flow passage, through the plurality of vents and into the inner drying chamber of the inner housing shell to more efficiently and quickly dry a pet or animal that is placed therein.

* * * * *